United States Patent
Rucker et al.

(10) Patent No.: US 6,195,657 B1
(45) Date of Patent: Feb. 27, 2001

(54) SOFTWARE, METHOD AND APPARATUS FOR EFFICIENT CATEGORIZATION AND RECOMMENDATION OF SUBJECTS ACCORDING TO MULTIDIMENSIONAL SEMANTICS

(75) Inventors: James L. Rucker; Marcos J. Polanco, both of San Francisco, CA (US)

(73) Assignee: Imana, Inc., San Francisco, CA (US)

( * ) Notice: Subject to any disclaimer, the term of this patent is extended or adjusted under 35 U.S.C. 154(b) by 0 days.

(21) Appl. No.: 08/936,726

(22) Filed: Sep. 25, 1997

Related U.S. Application Data

(60) Provisional application No. 60/026,723, filed on Sep. 26, 1996.

(51) Int. Cl.$^7$ .................................................. G06F 17/30
(52) U.S. Cl. ................................................................ 707/5
(58) Field of Search ............................ 707/3–5; 705/10, 705/26, 27

(56) References Cited

U.S. PATENT DOCUMENTS

| | | | |
|---|---|---|---|
| 4,870,579 | 9/1989 | Hey | 364/419 |
| 4,970,681 * | 11/1990 | Bennett | 707/3 |
| 4,996,642 | 2/1991 | Hey | 364/419 |
| 5,583,763 | 12/1996 | Atcheson et al. | 364/551.01 |
| 5,666,442 * | 9/1997 | Wheeler | 382/209 |
| 5,717,913 * | 2/1998 | Driscoll | 707/5 |
| 5,724,567 * | 3/1998 | Rose et al. | 707/2 |
| 5,749,081 * | 5/1998 | Whiteis | 707/102 |
| 5,754,938 * | 5/1998 | Herz et al. | 455/4.2 |
| 5,754,939 * | 5/1998 | Herz et al. | 455/4.2 |
| 5,790,426 * | 8/1998 | Robinson | 364/554 |
| 5,835,087 * | 11/1998 | Herz et al. | 345/327 |
| 5,857,179 * | 1/1999 | Vaithyanathan et al. | 707/2 |
| 5,867,799 * | 2/1999 | Lang et al. | 707/1 |
| 6,041,311 * | 3/2000 | Chislenko et al. | 705/27 |
| 6,049,777 * | 4/2000 | Sheena et al. | 705/10 |
| 6,092,049 * | 7/2000 | Chislenko et al. | 705/10 |
| 6,112,186 * | 8/2000 | Bergh et al. | 705/10 |

OTHER PUBLICATIONS

Douglas W. Oard, et al., A Conceptual Framework for Text Filtering, Technical Report CLIS–TR–96–02, University of Maryland, College Park, College of Library and Information Services, 1996.

Loren Terveen, et al, PHOAKS: A System For Sharing Recommendations, Communications of the ACM, 40(3):56–62, Mar. 1997.

B. Miller, et al., Experience with GroupLens: Making Usenet Useful Again, pp. 1–17, Proceedings of the 1997 Usenix Winter Technical Conference, Jan. 1997.

Henry Kautz, et al., ReferralWeb: Combining Social Networks and Collaborative Filtering, Communications of the ACM, 40(3):63–65, Mar. 1997.

(List continued on next page.)

*Primary Examiner*—Maria N. Von Buhr
(74) *Attorney, Agent, or Firm*—Allston L. Jones

(57) ABSTRACT

A system for determining recommendations which are likely to be relevant to a user's current tasks. The determination is made based on the user's grouping behavior as applied to collected references, documents and information objects. The recommendations are with respect to one or more of the "target" user's existing groupings or categories, and can be of information objects, categories of information objects, or other users who have created similar groupings of objects to the target user's groupings. The basis for recommendations is the discovery of "matching" categories for a "target" category, where a matching category is one that includes at least one object also included in the target category. Objects which are in matching categories but not in the target category are candidates for recommendation. In this way the recommendation system aids the target user by taking advantage of objects gathered and grouped by other users over time.

28 Claims, 10 Drawing Sheets

OTHER PUBLICATIONS

Joseph A. Konstan, et al., GroupLens: Applying Collaborative Filtering to Usenet News, Communications of the ACM, 40(3):77–87, Mar. 1997.

Paul Resnick, et al., GroupLens: An Open Architecture for Collaborative Filtering of Netnews, Proceedings of the ACM Conference on Computer Supported Cooperative Work, pp. 56–58,175–186, Chapel Hill, NC, 1994.

David Goldberg, et al., Using Collaborative Filtering to Weave an Information Tapestry, Communications of the ACM, 35(12):61–70, Dec. 1992.

Donald Fisk, An Application of Social Filtering to Movie Recommendation, BT Technology, 14(4):124–132, Oct. 1996.

Upendra Shardanand, et al., Social Information Filtering: Algorithms for Automating "Word of Mouth", Conference on Human Factors in Computing Systems (CHI '95), Denver, CO, May 1995.

Kent Wittenburg, et al., Group Asynchronous Browsing on the World Wide Web, Proceedings of the 4th International World Wide Web Conference, Boston, MA, Dec. 1995.

Will Hill, et al., Recommending And Evaluating Choices In A Virtual Community of Use, Conference on Human Factors in Computing Systems (CHI '95), Denver, CO, May 1995.

David Maltz, et al., Pointing the Way: Active Collaborative Filtering, Conference on Human Factors in Computing Systems (CHI '95), Denver, Co. May 1995.

Peter W. Foltz, et al., Personalized Information Delivery: An Analysis of Information Filtering Methods, Communications of the ACM, 35(12):51–60, Dec. 1992.

Nicholas J. Belkin, et al., Information Filtering and Information Retrieval: Two Sides of the Same Coin?, Communications of the ACM, 35(12):29–38, Dec. 1992.

Tak W. Yan, et al., SIFT– A Tool for Wide–area Information Dissemination, Proceedings of the USENIX Technical Conference, pp. 177–186, New Orleans, LA, Jan. 1995.

* cited by examiner

SOFTWARE, METHOD AND APPARATUS FOR EFFICIENT CATEGORIZATION AND RECOMMENDATION OF SUBJECTS ACCORDING TO MULTIDIMENSIONAL SEMANTICS

This application claims benefit of Provisional No. 60/026,723 filed Sep. 26, 1996.

FIELD OF THE INVENTION

The present invention is related to collaborative filtering, information filtering, and knowledge management, more specifically to automatically recommending to a user objects and other users of a computer system based on categories and objects identified by each user.

BACKGROUND OF THE INVENTION

In today's business environment it is becoming increasingly difficult for each of us to stay informed. Each separate task might involve both collecting a number of documents and seeking information from relevant colleagues. The number of potentially relevant documents is vast, encompassing both those internal to an organization, and those available over public computer networks such as the World-Wide Web. In addition, in many organizations, the number of potentially relevant colleagues within the organization can be so large that an employee is unable to locate the best sources of knowledge without assistance.

Filtering systems exist which attempt to keep users informed by delivering relevant documents (e.g., Tak W. Yan and Hector Garcia-Molina, "SIFT—A Tool for Wide-Area Information Dissemination" *Proc. of the 1995 USENIX Tech. Conf.*, pp 177–86, 1995). Unfortunately, these systems are based on preferences which need to be explicitly submitted by users. This is an onerous task. It is not always easy for users to clearly define their preferences nor to formulate them in a way that allows the computer system to make sense of them. Commonly used techniques require the user to specify a list of keywords denoting their interests, or to select from among a predetermined set of categories. Both of these requirements impose an additional workload upon the user.

Alternative systems exist which perform "collaborative filtering," for instance systems described in U.S. Pat. Nos. 4,996,642 (issued Feb. 26, 1991) and 5,583,763 (issued Dec. 10, 1996). In these systems, the user is required to denote a single set of favorite objects exemplifying their interests, or to supply preference scores for a number of objects. Once again, these are onerous tasks outside of the normal workload of a user. Furthermore, in many settings a user will have several different contexts for which they might require entirely different sets of recommendations. For instance, a user might be working on a number of projects simultaneously. The collaborative filtering systems referenced represent the user as having a monolithic set of interests and do not make different recommendations for different contexts.

There are also many varieties of "push" systems which do not attempt to target individual users or the specific interests of each user, but broadcast the same information objects to large segments of the user population. With this non-personalized approach, these systems end up adding to the problem of information overload rather than alleviating it.

Database systems exist which hold records of employee experiences, interests, skills, etc. These systems can be used to locate colleagues relevant to a particular task or project. Unfortunately, maintenance of such a database is expensive and difficult, and its use is not integrated into the employee's regular flow of work. In addition, these systems do not provide a single source for both relevant documents and relevant colleagues.

SUMMARY OF THE INVENTION

The present invention provides an efficient means for presenting a user with recommendations relevant to their current tasks and activities. These recommendations take the form of information objects, other users of the recommendation system who are pursuing or have completed similar tasks or activities, or categories of information objects other users of the system have gathered in the past. The information objects recommended can be of many different types; in the example embodiment the invention given in the Detailed Description section below is adapted to a recommendation system for documents accessible via a data communications network such as the World-Wide Web or a company intranet. In general any uniquely identifiable object is recommendable.

The invention operates on the assumption that users group related objects together in categories or folders, in the normal course of their work while pursuing information seeking or tracking activities. The resulting categories correspond to groupings which are meaningful, intuitive, and useful to the users who created them.

In an embodiment, in order to provide recommendations to a "target" user for a particular "target" category they have created, the recommendation system of the present invention discovers categories created by users which are similar to the target category. Similarity between a discovered category and the target category is determined in part by the number of information objects which are in both the discovered and target categories. "Matching" categories have at least one information object which is also in the target category. From the set of discovered matching categories, recommendations can be made of information objects which are not already in the target category, as well as of the users who originally submitted the matching categories, and of the matching categories themselves. These recommendations can be delivered to the target user in the context of their target category. Thus if the user has a number of target categories, the grouping of the resulting recommendations will match the user's own intuitive grouping as exemplified by their target categories, rather than some predetermined categorization created by an administrator or editor.

Further configurations of the present invention allow a user to initiate communications with other users who have been recommended as relevant to a target category. Such communications are archived by the system and can be recommended in the same way as other information objects, since human expertise can often be more valuable than that codified in documents or information objects. In addition, users can submit relevant recommendations back to the recommendation system, as exemplars of relevant topics, so that further recommendations on more specific or different themes can be delivered.

DESCRIPTION OF THE PRESENT INVENTION

Figure 1:
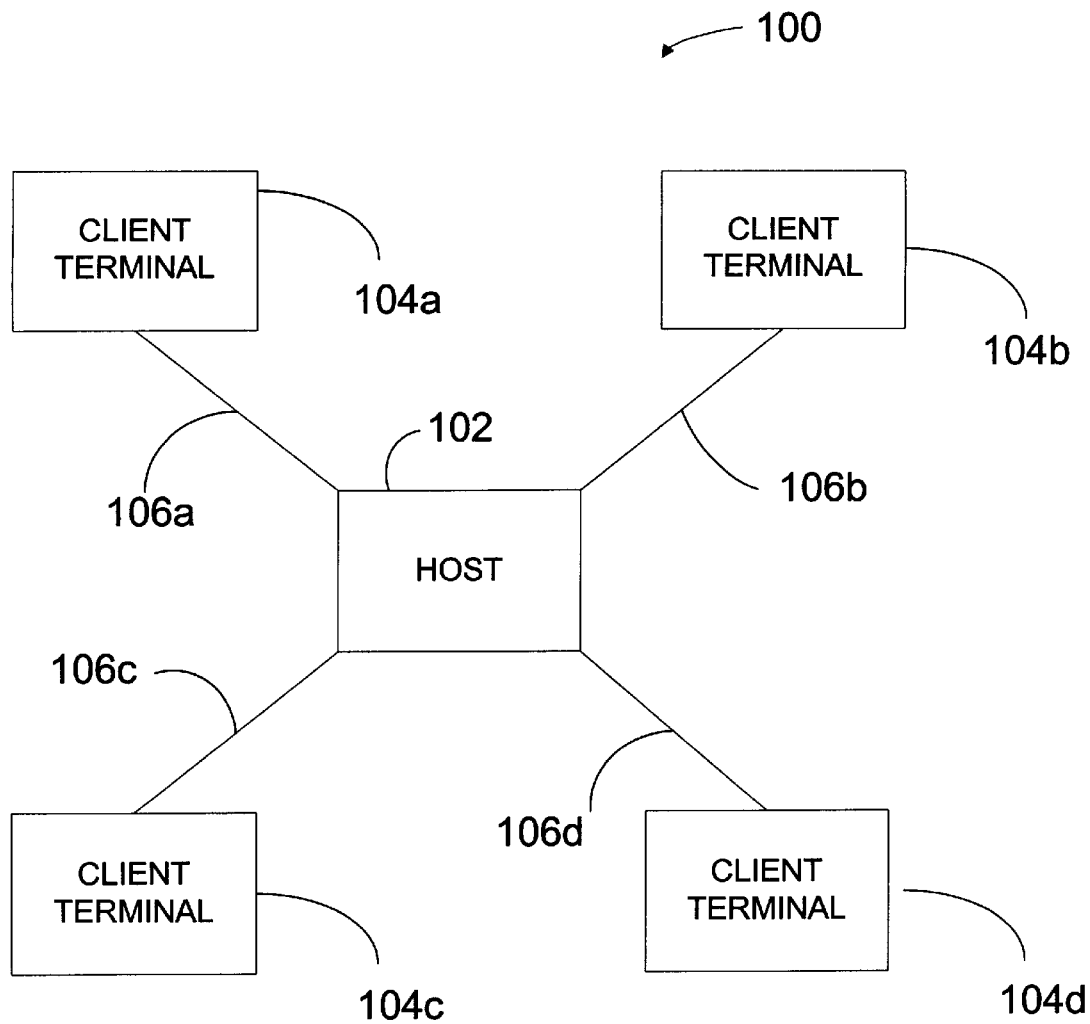
FIG. 1 is a simplified block diagram of a prior art network of several users connected to a central host computer.

FIG. 1 illustrates, in simplified block form, a portion of prior art network 100 used by the present invention to transfer information between a variety of users, or clients. Network 100 includes a host processing station 102 that, in one embodiment, is the storage center for information to be distributed among the various client to host 102 via communication links 106a, 106b, 106c and 106d, respectively.

It should be kept in mind that FIG. 1 is illustrative of but one configuration of a network to implement the present invention. In FIG. 1, any interconnection arrangement between host processing station 102 and client terminals 104x is possible. For example, host processing station 102 can be connected to client terminals 104x via star, ring, bus, or other well-known connection schemes.

Further, links 106x can be by hardwire, fiber optics, radio frequency communication, etc. Client terminals such as client terminal 104a are computing devices with digital transmit/receive capability (e.g., personal computers). Additionally, host processor station 102 could include one or more computers connected to mass storage devices such as multiple disk drives, tape drives, etc., whichever is best for the network being implemented. Thus, host processor station 102 could be the central processing system of any kind of network, even multiple computers that are tied to each other in an intranet or internet configuration, even a collection of ISPs (Internet Service Providers) that are connected to the World Wide Web.

Figure 2:
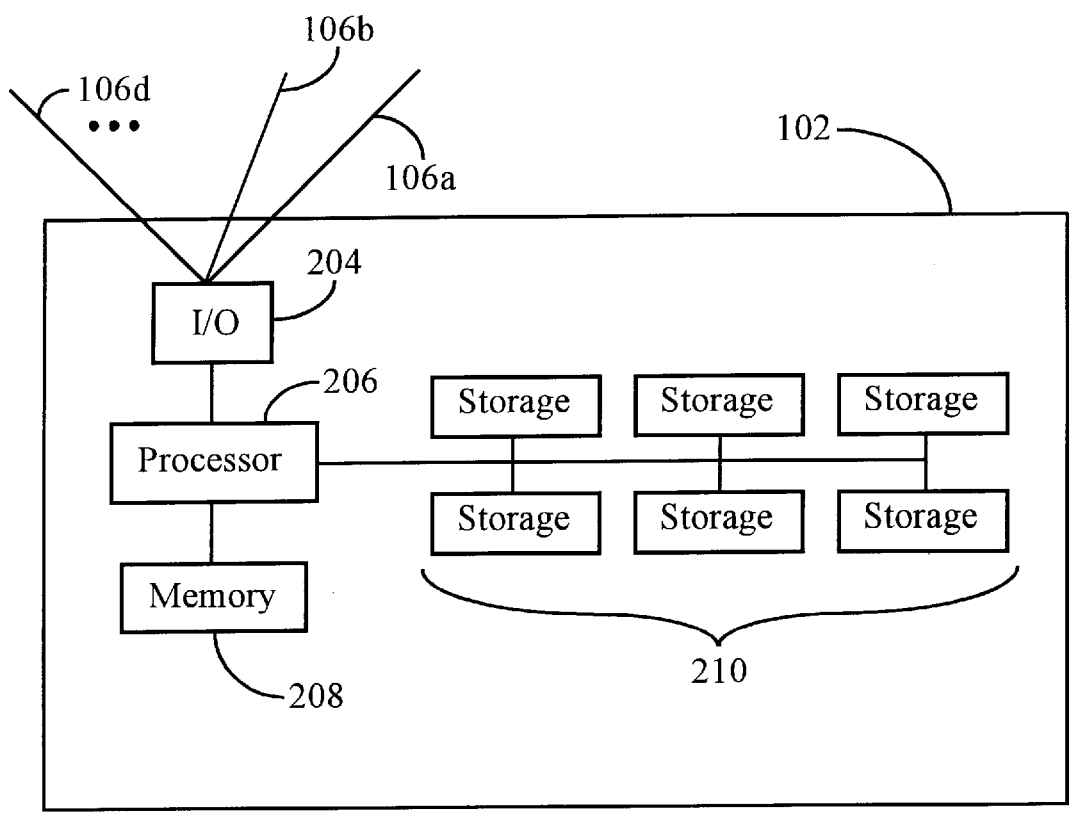
FIG. 2 is a simplified block diagram of a prior art host computer of the network of FIG. 1.

Referring next to FIG. 2 there is shown a simplified block diagram of host processing station 102 of FIG. 1. As shown here, host processing station 102 includes an I/O controller 204 to interface between client terminals 104x via links 106x and a processor 206. Coupled to processor 206 are memory 208 (e.g., RAM) and storage devices 210 (e.g., hard disk drives).

I/O controller 204 is provided to condition, as well as to transmit and receive signals between host 102 and client terminals 104x. Memory 208 is typically a solid state RAM memory for fast random access and is used, for example, to perform buffering functions, intermediate storage for mathematical calculations, database functions, etc., and storage devices 206 are provided to provide long term data storage.

It will be apparent to one of ordinary skill in the art that many configurations for host processing station 102 that vary from that shown in FIG. 2 are possible without deviating from the scope and concept of the present invention. Specifically, additional hardware components (functional blocks) may be present in host processing station 102 such as tape drives, CD ROM drives, and additional processors. Any suitable computer system that is capable of supporting a network of client terminals 104x may be used.

Figure 3:
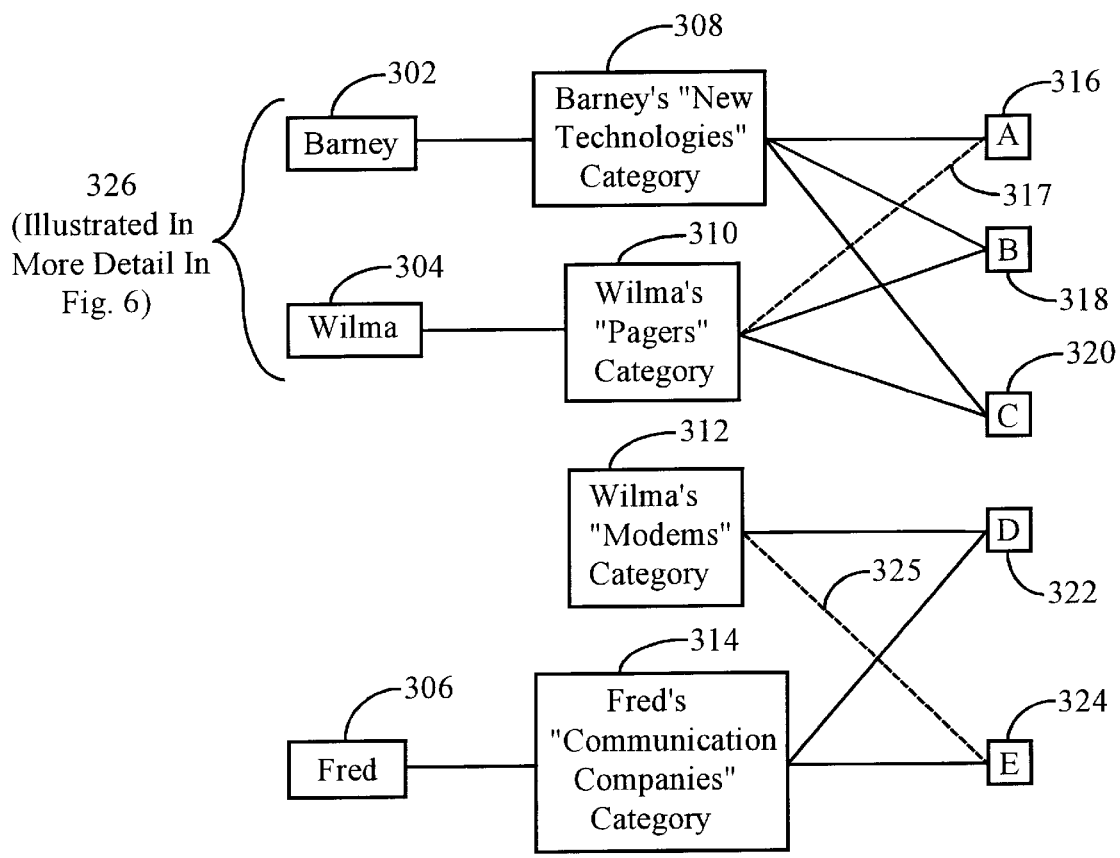
FIG. 3 is a schematic representation of the data structures of a simplified illustrative example of the present invention.

Referring next to FIG. 3 there is shown a simplified illustration of one embodiment of the present invention that is adapted to perform an information object and colleague recommendation service. Such a recommendation service has a number of users, i.e., Barney 302, Wilma 304 and Fred 306, each of which would be using a different one of client terminals 104x of FIG. 1. Each of Barney, Wilma and Fred in turn have personally defined categories of items, or objects, that they wish to keep track of using their client terminal 104x. In FIG. 3 it is shown that Barney has created a "New Technologies" category (308); Wilma has created two separate categories, namely "Pagers" (310) and "Modems" (312); while Fred has created the category "Communication Companies" (314).

The present invention, in turn, via host 102, monitors the categories established by Barney, Wilma and Fred, as well as the groupings of objects that they each have placed in their various user created categories. In this embodiment, information objects the users have gathered and grouped together in categories are monitored. For instance, users might group documents they have discovered into several categories. Thus, in the present invention, each category exemplifies an information seeking or information tracking task. Note that no explicit action is required on a user's part. Users do not need to formulate queries, choose keywords, select from predetermined categories or specify favorite or preferred objects.

In general any type of uniquely identifiable object can be recommended by the present invention. In the preferred embodiment, the "domain" is information objects accessible via a public data communications network, for instance World-Wide Web pages. However, other domains would be equally feasible, for instance books, movies, music compact discs, etc.

Figure 4:
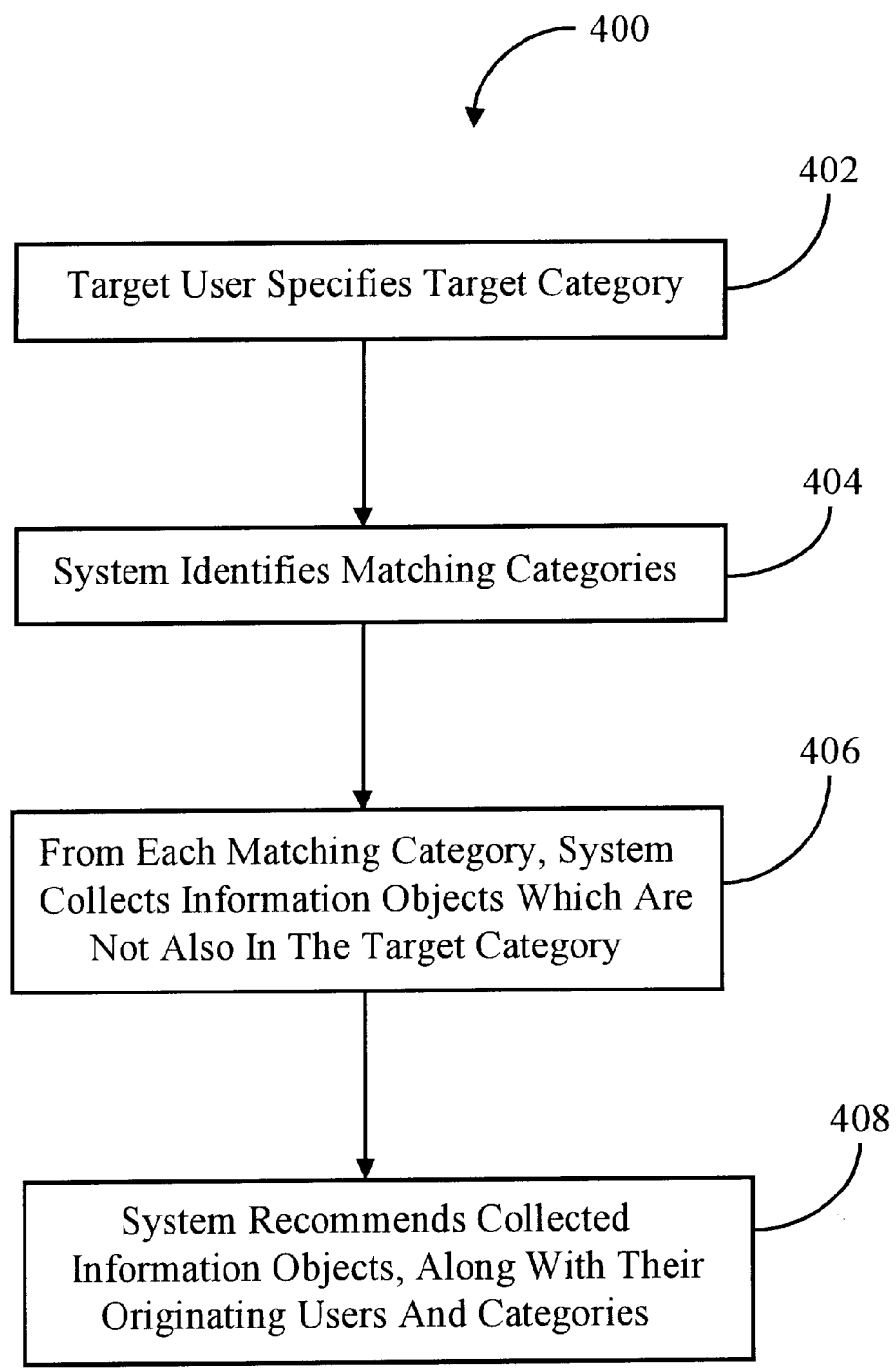
FIG. 4 is a simplified flow chart to illustrate the decision flow of the present invention with respect to the example of FIG. 3.

More specifically, FIG. 3 illustrates the data structures of the present invention in schematic fashion, and FIG. 4 presents a flow chart 400 which shows the operation of this embodiment in broad steps. In this example, user records 302, 304 and 306 are records for users: Barney, Wilma and Fred; and for the purposes of this illustration it is assumed that Barney, Wilma and Fred are the only users of the recommendation service.

In this scenario, user Wilma has a task of "investigating the pager market" with the following example demonstrating how the recommendation service of the present invention helps Wilma with this information seeking task. In the following discussion, Wilma is the "target user" that has requested the recommendation system of the present invention to search for additional objects that fit within the specified category that Wilma has created, and "pagers" (310) is the target category.

On her client terminal 104x (e.g., a personal computer), Wilma has created an electronic folder, or category 310, to contain references to discovered documents pertaining to the task "investigating the pager market". Step 402 of FIG. 4 illustrates Wilma's submission of category 310 to the recommendation system, giving it the title "Pagers". Category 310 is the representation of this category within the database accessible by the recommendation system. In the normal course of work, Wilma has discovered two relevant documents, or information objects, "B" (318) and "C" (320) related to "pagers". Correspondingly, category 310 is linked to record 318 for information object "B" and record 320 for information object "C".

Also, user Barney had previously submitted a single category 308, named "New Technologies", containing information objects "A" (316), "B" (318) and "C" (320). Correspondingly, category 308 is linked to three information object records: record 316 for information object "A," record 318 for information object "B," and record 320 for information object "C".

At step 402 (FIG. 4), the target user invokes the recommendation service by specifying a particular category for which recommendations are required. In this example user Wilma has specified the "Pagers" category, category 310, as the "target" category.

Then at step 404 the recommendation system next identifies matching folders or categories. A matching category being a category which has been submitted by another user of the system, and which has at least one linked information object record in common with the target category. It is assumed that a category is likely to be relevant, and therefore a match, to the target category by virtue of the inclusion of a common information object record, and thus each additional information object record contained in the matching category having a high likelihood of being relevant to the target user's task as exemplified by the target category.

Matching categories are identified by correlating the linked information object records of the target category to the linked object records of other users' categories. That correlation is performed at host processing station 102 of FIG. 1. In this example, category 308 of FIG. 3, Barney's "New Technologies" category, is the only matching category to target category 304 since it is the only category in this example that contains either of the objects "B" and "C" that are linked to the target category "pagers" (310).

At step 406, recommendations are selected by the recommendation system from the union of linked information objects in the matching categories, considering only those which are not already linked to the target category. In this example the only recommendation is information object "A", represented by record 316 of FIG. 3. Then at step 408, such recommendations will be delivered to the target user in the context of the target category. In this example, Wilma receives a recommendation of information object "A" in the context of her "Pagers" category as illustrated by broken line 317 in FIG. 3. This recommendation might be delivered by the addition of an iconic or textual representation of object "A" to a representation of the target category "Pagers" on a graphical user interface on user Wilma's personal computer.

The reasoning behind this recommendation is as follows. User Barney considers information objects "A", "B" and "C" to be related, since all of them are part of his "New Technologies" category. User Wilma has already discovered information objects "B" and "C" and grouped them in her "Pagers" category, presumably because she considers "B" and "C" relevant to her "Pagers" category. Therefore, it is likely that user Wilma would be interested in also seeing information object "A", since in user Barney's opinion it is related to the information objects she has already grouped together. In this way user Barney's experience can help user Wilma via an automatic recommendation system, without either user even needing to know of the other's existence. Additionally, this allows the recommendation system of the present invention to not require a built-in filtering criterion by which to judge whether or not an object identified by one user as being relevant to at least one object identified by a target user as being relevant to the target category. The recommendation system of the present invention thus relies on the expertise of the individual users in their grouping of objects as a filter of what is related and what is not.

Each recommended information object delivered to the target user was submitted to the recommendation system by one or more "originating users". For each originating user the information object was submitted in the context of a particular category, referred to as the "originating category". As well as delivering recommended information objects, at step 408 the recommendation system will additionally deliver identifiers of the originating categories and originating users. In some scenarios the identities of the originating user(s) is/are more relevant to the target user than the recommended information objects themselves, for example if the target user is attempting to locate colleagues who may be able to help with a particular task related to the contents of the target category.

In the example of FIGS. 3 and 4, as well as recommending a reference to information object "A" at step 408, the recommendation system could further deliver an identifier for the originating user, "Barney", represented by user record 302, and an identifier for Barney's "New Technologies" category, represented by category record 308.

Referring again to FIG. 3, Wilma had previously also submitted category 312, named "Modems," containing information object "D" (322). Correspondingly, category 312 is linked to one information object record, record 322 for information object "D". User Fred had also previously submitted a single category 314 named "Communications Companies", containing information objects "D" and "E" with category 314 linked to the two information object records, record 322 for information object "D" and record 324 for information object "E". Here, if Wilma's category "modems" had been designated as the "target category", then, using the same rationale discussed above, Fred's object E (324) would be recommended to Wilma's "modems" category 312 as indicated by broken line 325 in FIG. 3.

Having presented the recommended information objects, the recommendation system can now allow the user to optionally select one or more information objects from those recommended as being of particular interest. By creating a special new target category linked to just the selected information objects, the recommendation process of the present invention can be repeated, to provide a new set of recommendations of relevance to the selected information objects. In the present example, the system could construct a new target category linked to a single information object record, namely record 316 of FIG. 3 representing information object "A". The system could then recommend further information objects or colleagues relevant to this new target category. However the small size of the example database means that no further recommendations would be possible in this particular case.

Having received identities of originating users, one option for the target user is to select a number of these originating users and initiate some form of synchronous or asynchronous communication. In such an embodiment, the user can optionally initiate an electronic discussion among the selected originating users by clicking on a button on a computer screen (e.g., hypertext, a web browser, or an icon when the user is using a graphical interface on the client terminal). This discussion could be transmitted over a number of media, for instance it might consist of a series of electronic mail messages. The purpose of this feature is to allow the target user to contact colleagues who might have knowledge or experience pertinent to the task at hand. For instance, in the current example, user Wilma could elect to send an electronic mail message to user Barney, since he may have experience which would be relevant to her task of "investigating the pager market". In such an embodiment, such electronic mail messages would be routed through host processing station 102 by means of an electronic mailing list hosted on that same host processing station. The recipients of the mailing list are defined to be the originating users selected by the target user, as well as the target user.

Further, the full text of the ensuing electronic discussion is also archived on the host processing station, in the form of a "discussion object", an information object accessible via a public data communications network, e.g., a World-Wide Web page. Optionally, access restrictions would be imposed on such an information object, for instance only allowing the recipients of the electronic mailing list to access or be recommended the object. Further, the information object representing the electronic discussion can automatically be appended to the target category, and henceforth be available for recommendation to future target users. For instance, in the current example, the ensuing series of electronic mail messages between users Wilma and Barney can be stored on a World-Wide Web page, which can be linked in the system's database to user Wilma's "Pagers" category. In the future, a user with a category which correlates with Wilma's "Pagers" category might have that discussion object recommended to them, in the same way as any other information object is recommended by the present invention.

In a more complex example there could be several originating users and originating categories. For instance, many users could have submitted categories which linked to information objects "A," "B" and "C".

To enable a target user to identify and locate a copy of a recommended object, unique object identifiers are recommended as references to information objects, particularly if the originating user has elected to not be identified to a target user together with recommended objects, e.g., Uniform Resource Locators (URLs) which are commonly used as location pointers to World-Wide Web pages; ISBN numbers, or complete title, author and publisher for books; or periodical volume number and page for published articles.

In the simple example given, all objects were from a single domain. However, an embodiment could include several domains. For instance, users could group both books and movies using the same set of categories. By associating a domain field with each object, the recommendation system can selectively recommend items only from certain domains, or only use certain domains when finding matching categories. Selection of domains for matching or recommendation can optionally be under the control of the target user or of a central administrator.

In another configuration of the present invention, a central administrator, via host processing station 102, could define a set, or hierarchy, of categories to be used by all of the users. In that case, user Wilma would need to choose an existing category from that set in which to collect her information on "investigating the pager market".

An extension of the present invention is to permit the recommendation system to automatically scan the memory of the user's personal computer for folders or categories, rather than having all of the information stored in host 102. For instance, the user might be using well-known software packages which generate such categories or electronic folders, e.g., a Web browser which allows the creation of a hierarchy of "bookmarks", "favorites" or "short-cuts" to Web pages. A further option is for the recommendation system itself to provide means for defining and storing such categories or electronic folders. For example: (1) if the user uses a web browser to create a set of bookmarks, hierarchically organized, then the software running on the client termanl can copy those bookmarks, submit them to the host processing station, receive recommendations, perhaps just into bookmark folders which have changed since the last time this process happened, and then present those recommendations in the context of the user's own bookmark hierarchy; and (2) part of the recommendation system software can be software running on the client terminal which provides means for organizing location pointers for web pages into categorties, locally storing the categorties, and communicating with the host processing station to initiate recommendation delivery.

A further extension of the present invention is for the recommendation system to accept a single information object specified by a user, without first creating a category, with the recommendation system automatically creating a category that is the same as the specified object. The information object could be specified by supplying a location pointer. In this way recommendations can alternatively be provided to a target user which will be relevant to the single supplied information object.

Another option is that, as part of the recommendation system, software running on a user's client terminal 104 continually monitors the user's placement of documents or information objects into categories, as well as the creation, deletion and alteration of those categories. In this case the recommendation system would automatically make recommendations for all categories where the user has effected some change, triggered by that change. Additionally, the recommendation system could be structured to automatically incorporate user categorization changes as they occur and initiate the preformance of another recommendation process.

A further enhancement of the present invention is to allow users to specify a privacy setting when submitting a new category. The user could specify that a category should be "private," in which case information from that category would not be used to make recommendations to other users. Alternatively, a user could specify that a category be marked "anonymous" resulting in the identity of the originating user being withheld when delivering recommendations from an "anonymous" category. Another option is to mark a category "hidden", in which case only the identity of the originating user could be delivered, whereas the constituent information objects would be withheld. Finally, the user could specify that a category be marked "public" with recommendations originating from a "public" category freely being made that also identify the originating user.

Figure 5:
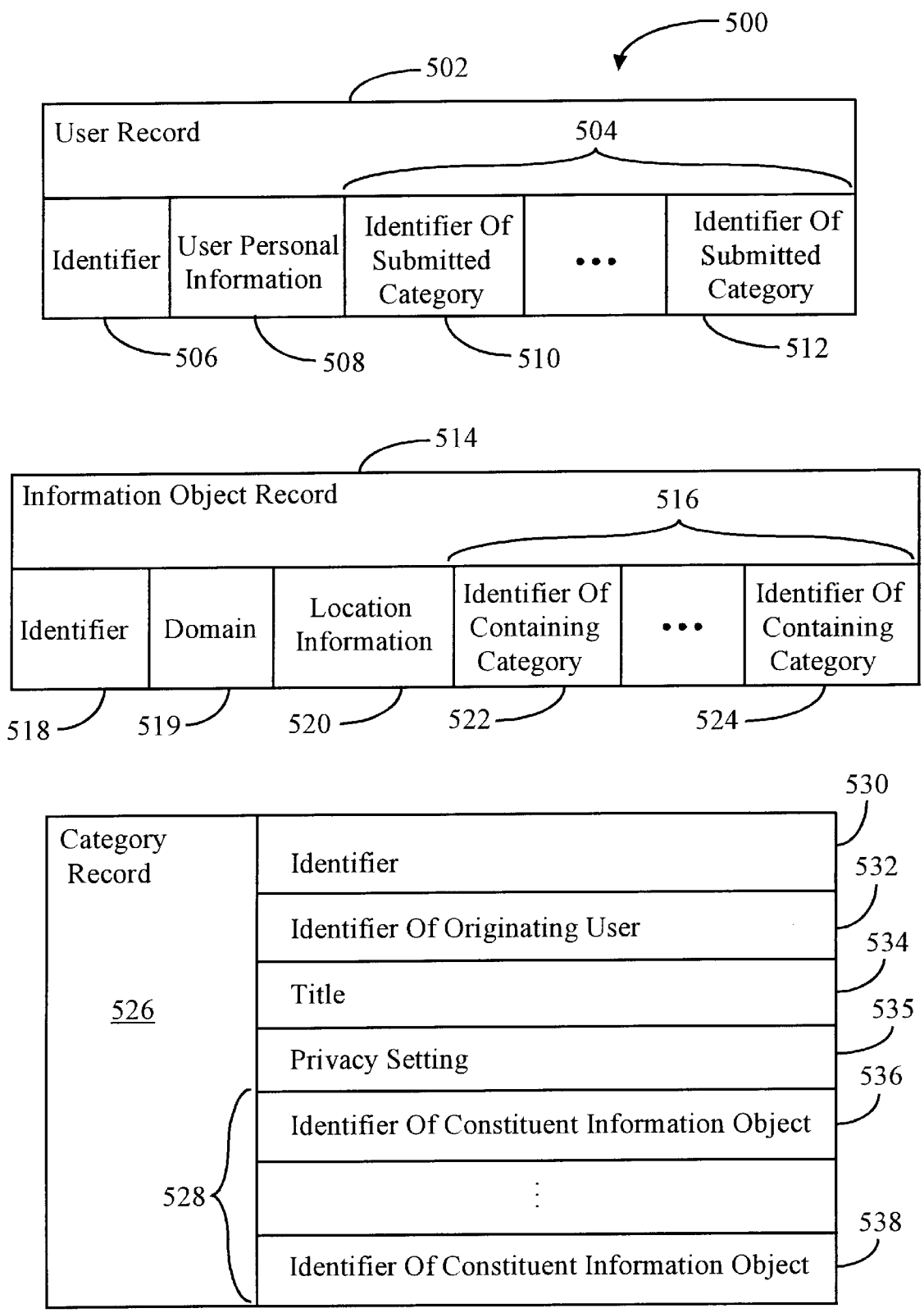
FIG. 5 is an illustration of the database organization of the present invention.
Figure 6A:
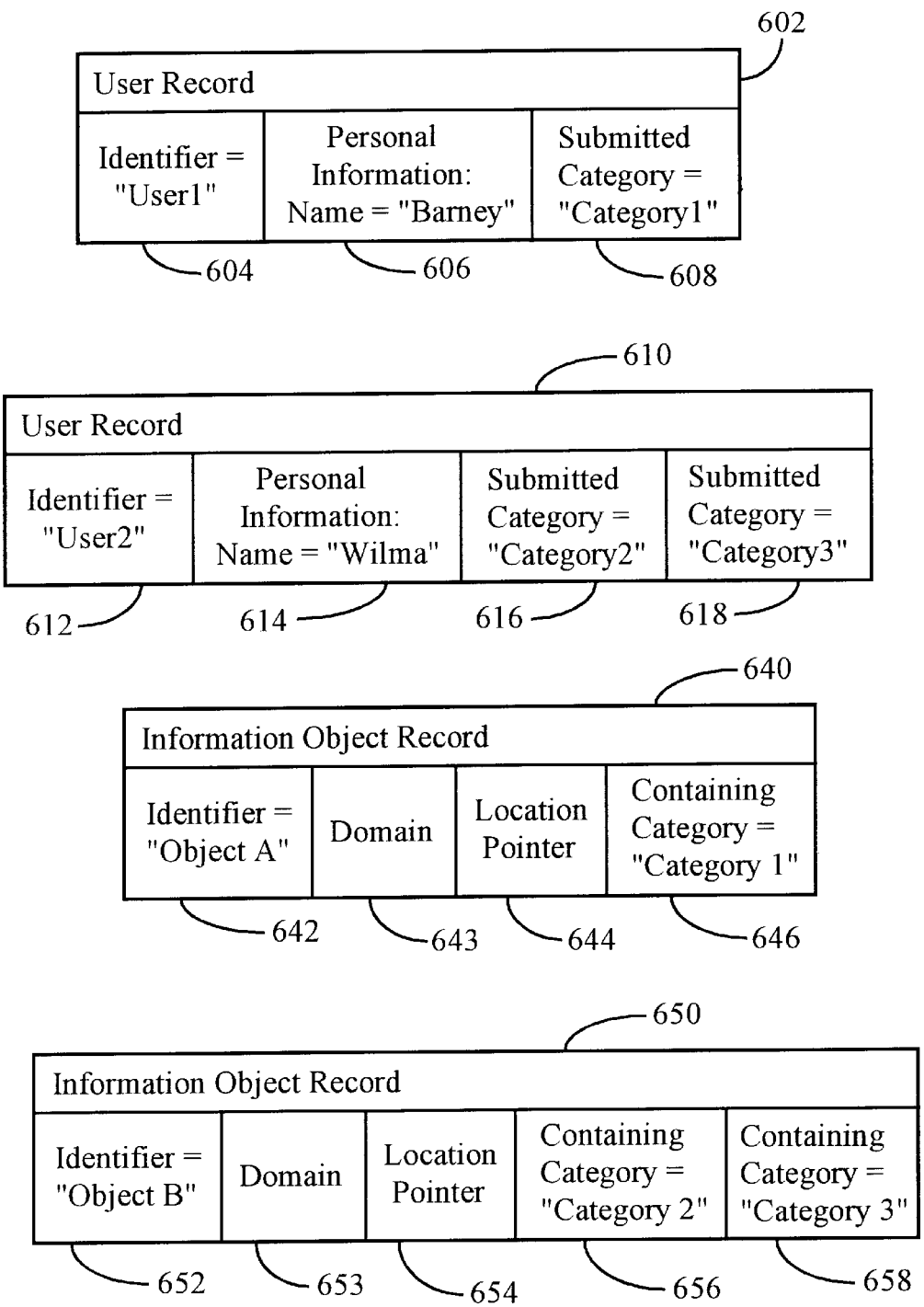
FIG. 6 is a specific illustration of the database organization for the target example of FIG. 3.
Figure 6B:
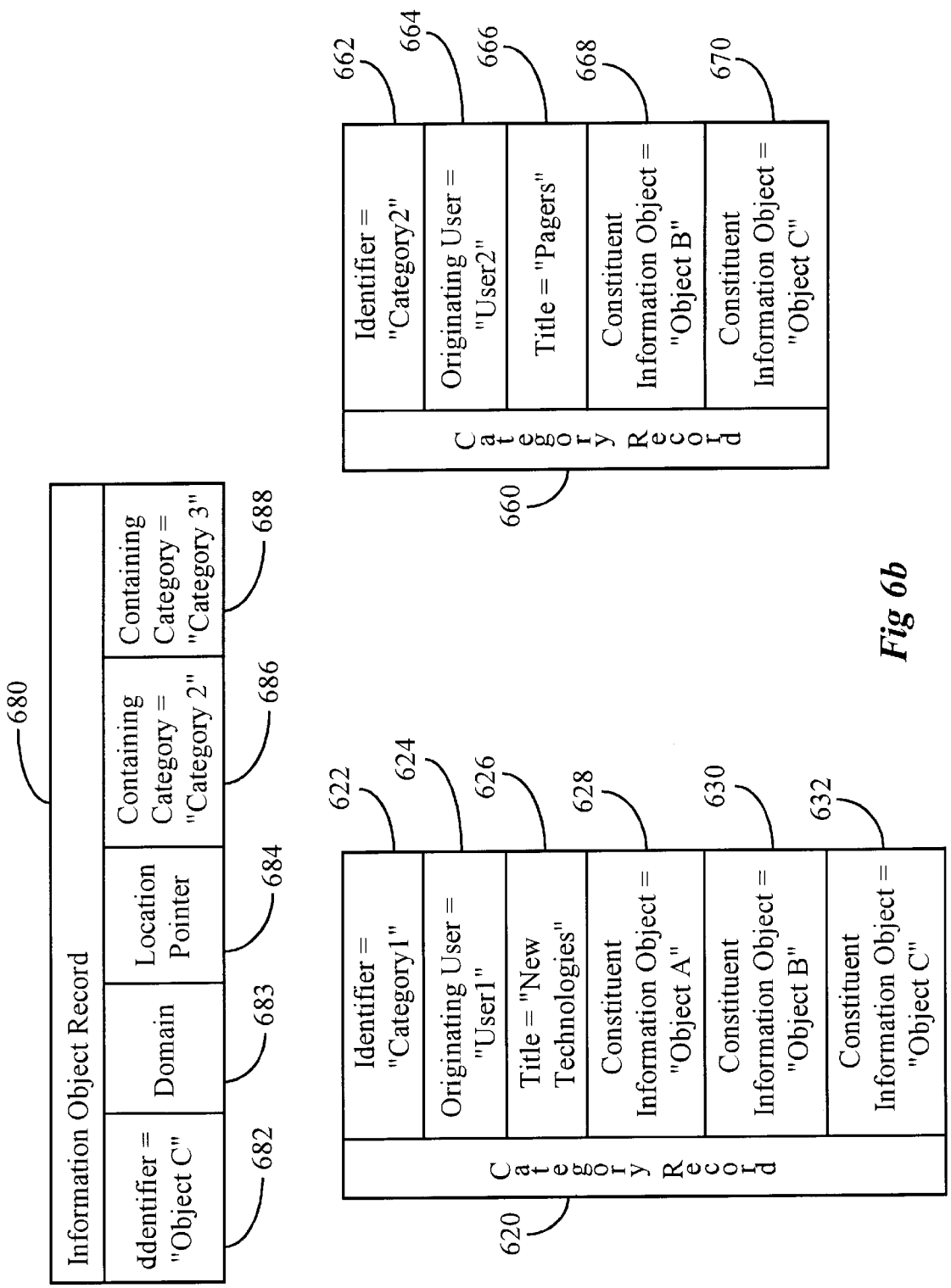

Next FIGS. 5–8 are discussed in connection with a more detailed explanation of a preferred embodiment of a recommendation system of the present invention. Before proceeding to explain the steps of the flowcharts of FIGS. 7–8, it would be helpful to review the underlying database organization of the present invention as illustrated in FIGS. 5–6.

FIG. 5 shows an embodiment of a database organization 500 which can be used by the present invention to make recommendations. In a preferred embodiment, records of types as illustrated in FIG. 5 can be stored in storage 210 of host processing station 102 as shown in FIG. 2.

As shown in FIG. 5, there are three kinds of records included in database organization 500: a user record 502 with one each for each user for user identification; a category record 526 with one for every category identified by any and all of the several users for identifying the category; and an information object record 514 with one for each object included within at least one specific category by any user (i.e., it is not repeated as additional users include the same object record in additional categories, those additional categories are linked to the same information object record).

Each user record 502 comprises several fields. A first of those fields is an identifier 506, which may be a sequence of characters, that is assigned uniquely to this record. User record 502 further comprises a field for user personal information 508, which may comprise such items as the user's name, telephone number, electronic mail address, position within a company, World-Wide Web address of the user's personal "home page", etc. User record 502 also includes a field 504 for identifiers of categories submitted by the user identified in field 508. In turn, field 504 contains at least one sub-field with a unique identifier of each submitted category 510 . . . 512 designated by the user identified in field 508.

Each information object record 514 comprises an identifier 518, which may be a sequence of characters, and is assigned uniquely to this record. Each information object record 514 further comprises a domain field 519, which would identify the domain of this information object (e.g., a World-Wide Web page, book, movie, publication, etc.). The information object record also comprises a location pointer 520, which is sufficient for retrieval of this information object (e.g., from a data communications network where the location pointer could be a URL). The information object record also comprises a field 516 for individual identifiers of each category defined by any of the several users that includes the specific information object for which the specific information object record was created. Each identifier 522 . . . 524 is sufficient to uniquely determine a category record, and that category record in turn includes a linked identifier to the information object record 514 that specifically identifies the object.

Similarly, a category record 526 comprises identifier 530, which may be a sequence of characters, and is assigned uniquely to this record. The category record 526 further comprises a field 532 containing an identifier of the user record of the user that defined the category for which the category record was created, and a field 534 containing the title of the category assigned by the originating user. The category record also comprises an optional privacy setting 535, which records the user's specifications about the visibility of this category to other users over a network. If used, the privacy setting will hold one of four possible settings as already discussed: private, public, anonymous or hidden. The category record also comprises a field 528 that contains at least one sub-field 536 . . . 538 that contains an identifier that points to a corresponding information object record for an object that the user has placed in the category represented by the category record. Each identifier in subfields 536 . . . 538 is sufficient to uniquely determine an information object record, and that corresponding information object record in turn includes an identifier to this category record thus cross-linking the two.

This data structure has been selected for the preferred embodiment of the present invention to minimize the size of the data storage that will be necessary and to minimize the time required to preform the recommendation service of the present invention. By no means is this the only way that the data could be structured. Additionally, by structuring the data in this way the size of each record is minimized and those records, namely the information object records, that could apply to more than one user need only be created in detail once since it is shared among however many users may designate that object as being of interest.

With the aid of FIG. 6, the discussion of the example given above with respect to FIGS. 3 and 4 can now be extended to show the operation of the data structure of the present invention. In FIG. 6 the recommendation example between Wilma and Barney with respect to objects A, B and C is illustrated. Specifically, FIG. 6 shows the database records that correspond to portion 326 of FIG. 3. Portion 326 of FIG. 3 consists of the user records 302 (602) and 304 (610), the category records 308 (620) and 310 (660), and the information object records 316 (640), 318 (650) and 320 (680), with the reference number shown in parenthesis following the FIG. 3 references numbers being the corresponding FIG. 6 reference numbers for the same items.

In the following paragraphs where the records of FIG. 6 are discussed, the reference numbers in parenthesis are to the corresponding general record structure of FIG. 5 for comparison.

Looking at the user record for Barney, user record 602 (502), comprises: an identifier 604 (506), in this case "USER1"; user personal information 606 (508), in this case just the user's name "Barney"; and an identifier of a submitted category 608 (510), in this case the category whose identifier is "CATEGORY1".

Similarly, the user record for Wilma, user record 610 (502) comprises: an identifier 612 (506), in this case "USER2"; user personal information 614 (508), in this case just the user's name "Wilma"; an identifier of a first submitted category 616 (510), in this case "CATEGORY2"; and an identifier of a second submitted category 618 (512), in this case "CATEGORY3". The category record with identifier "CATEGORY3" is not illustrated in FIG. 6 since it was not part of the above discussed example of the recommendation between Barney and Wilma.

The two category records included in FIG. 6 are category records 620 and 660 the composition of which is discussed as follows. Category record 620 (526) is the record for "CATEGORY 1" identified by "USER 1", namely user Barney's "New Technologies" category, corresponding to category record 308 of FIG. 3. Category record 620 comprises: an identifier 622 (530), in this case "CATEGORY1"; an identifier of originating user 624 (532), in this case user "Barney" whose unique identifier is "USER1"; a title 626 (534) assigned by the originating user, in this case "New Technologies"; identifiers of constituent information object records 628, 630 and 632 (536 . . . 538) with identifiers "OBJECT A", "OBJECT B" and "OBJECT C", respectively.

Category record 660 (526) is the record for user Wilma's "Pagers" category, corresponding to category record 310 of FIG. 3. Category record 660 comprises: an identifier 662 (530), in this case "CATEGORY2"; an identifier of originating user 664 (532), in this case user "Wilma" whose unique identifier is "USER2"; a title 666 (534) assigned by the originating user, in this case "Pagers"; identifiers of two constituent information object records 668 and 670 (536 . . . 538) with identifiers "OBJECT B" and "OBJECT C" respectively.

Neither category record 620 nor category record 660 includes the optional privacy setting (535).

Additionally, there are three individual information object records illustrated, one for each of objects "A", "B" and "C". Looking first at the record for object "A", information object record 640 (514) is the record representing information object "A", corresponding to information object record 316 of FIG. 3. Record 640 comprises: an identifier 642 (518), in this case "OBJECT A"; a domain 643 (519) (e.g., "Web Page"); a location pointer 644 (520) sufficient to locate information object "A" (e.g., on a public data communications network); only one identifier of the containing category 646 (522), in this case the category with identifier "CATEGORY 1" (since the corresponding object was only identified by Barney in the example of FIG. 3).

A second information object record 650 (514) is the record representing information object "B", corresponding to information object record 318 of FIG. 3. Record 650 comprises: an identifier 652 (518), in this case "OBJECT B"; a domain 653 (519) (e.g., "Web Page"); a location pointer 654 (520) sufficient to locate information object "B" (e.g., on a public data communications network); two identifiers of containing categories 656 and 658 (522 . . . 524), in this case the categories with identifiers "CATEGORY 2" and "CATEGORY 3" (since the corresponding object was identified by both Barney and Wilma in the example of FIG. 3).

The third information object record 680 (514) is the record representing information object "C", corresponding to information object record 320 of FIG. 3. Record 680 comprises: an identifier 682 (518), in this case "OBJECT C"; a domain 683 (519) (e.g., "Web Page"); a location pointer 684 (520) sufficient to locate information object "C" (e.g., on a public data communications network); two identifiers of the containing categories 686 and 688 (522 . . . 524), in this case the categories with identifiers "CATEGORY 2" and "CATEGORY 3" (since the corresponding object was identified by both Barney and Wilma in the example of FIG. 3).

Thus, from FIG. 6 it is clear that in construction of the data base of the present invention there will be a separate user record 502 for each user of the recommendation service, there will be a separate category record for each category created by each and every user of the recommendation service with that category record linked to the specific user that created it, and there will be a separate information objection record for each object entered by any and all users with each information object record indicating each and every category to which each and every user may have assigned that object.

Figure 7A:
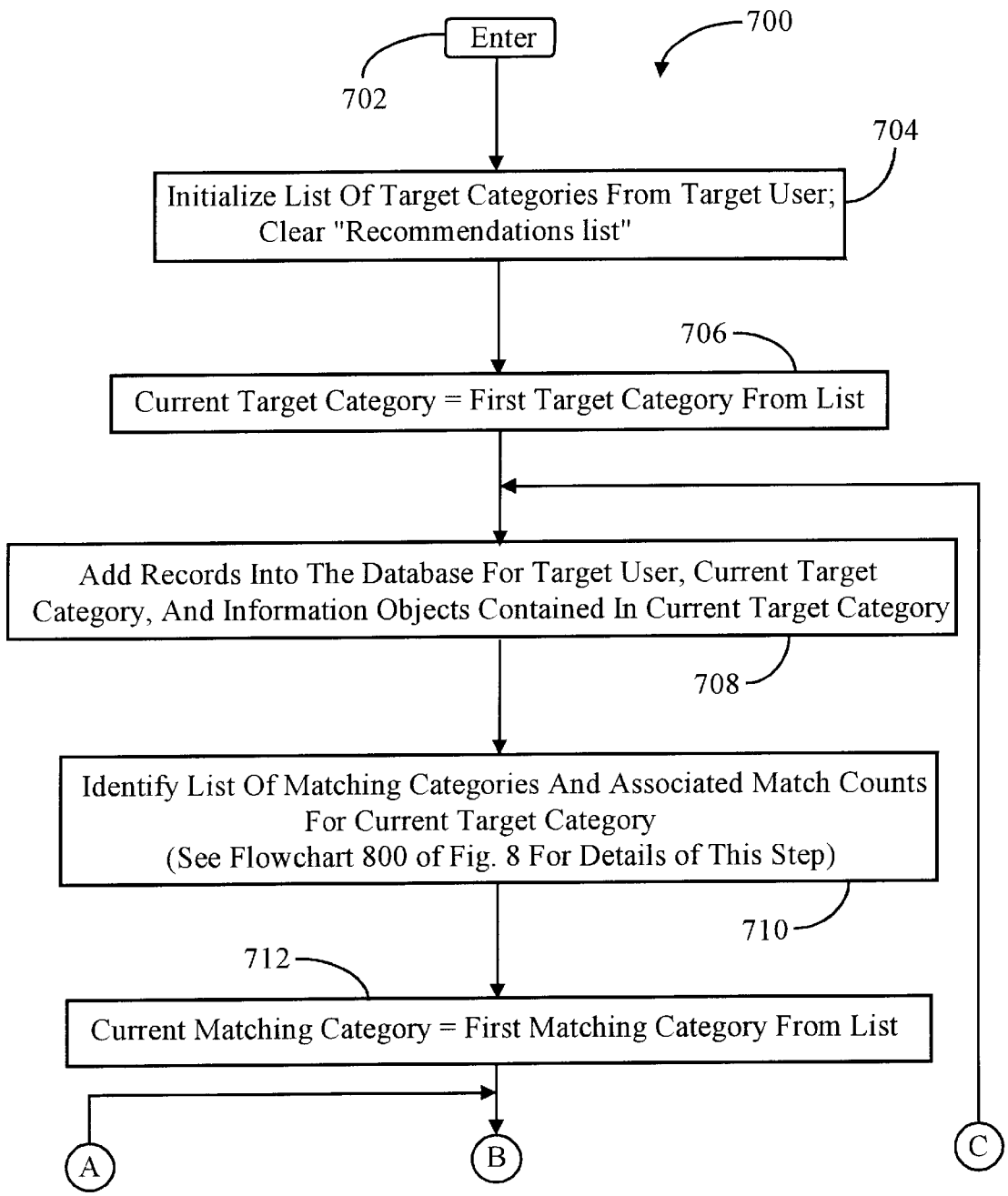
FIG. 7 is a flow chart to illustrate the recommendation routine of the present invention.
Figure 7B:
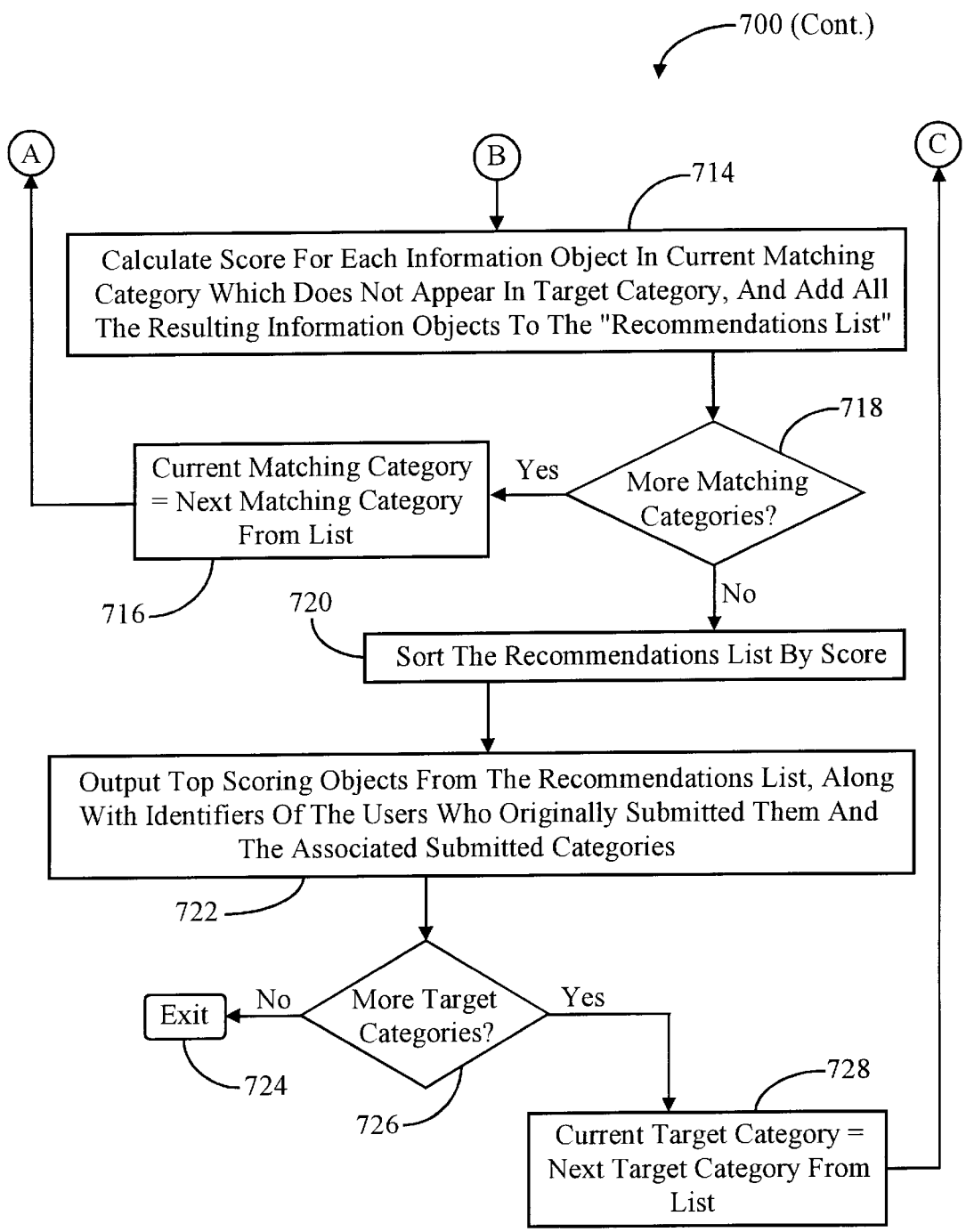

Referring next to FIG. 7 there is shown a more detailed flowchart 700 of a routine for recommending references of the present invention than that shown in FIG. 4. The decision flow represented by flowchart 700 can be implemented with one or more software routines on one or more computers. Further, flowchart 700 illustrates the broad logical flow of the routine of the present invention to accomplish the recommendation procedure in a more general case than the simplified example given above with respect to FIGS. 3, 4 and 6. Other logical flows to implement the present invention will also become apparent from the full details of the present invention and they will each be within the scope of the present invention. A software routine, or routines, implementing flowchart 700 may be written in any suitable computer language, such as "C", "Java", assembly language, or others. For ease of discussion we will refer to the routine of flowchart 700 as a single routine.

In FIG. 7 the routine is entered at step 702 where it is assumed that a target user and a set of target categories exist, which are to be correlated with other user's categories in the database. The database could exist, for example, in storage 210 of FIG. 2. In an alternative embodiment, at step 702 a target user and a set of target objects are assumed. Then the system will create a new single target category especially for this run, which contains all of the supplied target objects. In this way the user is able to request recommendations relevant to a single information object, or a set of such objects, without first having to define a category.

At step 704 a working list of target categories is initialized, while a "recommendations list" is cleared for use by the routine as described below.

At step 706, a first target category from the list created in step 704 is made the "current target category". Then, at step 708 a category record (526) for the "current target category" is added to the database, comprising the fields shown in category record 526 of FIG. 5. If a user record (502) for the "target user" does not already exist in the database, a new user record is also added, comprising the fields shown in user record 502 of FIG. 5, otherwise, the existing user record for the "target user" is located. A bidirectional link between the target user record and the new category record is created by means of fields 510 and 532, respectively, of FIG. 5.

For each information object in the target category (i.e., those objects already known to the target user and already included in the target category), if an information object record (514) of the object does not already exist in the database, a new information object record is created accordingly, comprising the fields shown in information object record 514 of FIG. 5, otherwise, the existing information object record for that information object is located. A bidirectional link between the target category record and each of the known information object records is created by utilizing fields 528 and 516 of FIG. 5, respectively. Optionally, the user can specify a scalar rating for each information object in the target category. For instance, the user could indicate the degree of relevance of an object to a category by supplying an integer rating in the interval −100 to +100. If supplied, such ratings could be stored in the database as part of the category records 526, for instance one such rating could be stored for each of the constituent object identifiers 528. This rating is not necessary for the functioning of the present invention, but its inclusion can potentially lead to a more precise ranking of recommendations.

Then at step 710, categories that match the "current target category" are identified in the database. As explained previously, matching categories are defined to be those categories which link to an information object record which is also linked to by the target category. For each matching category a "match count" is calculated as explained in relation to flowchart 800 of FIG. 8.

Figure 8:
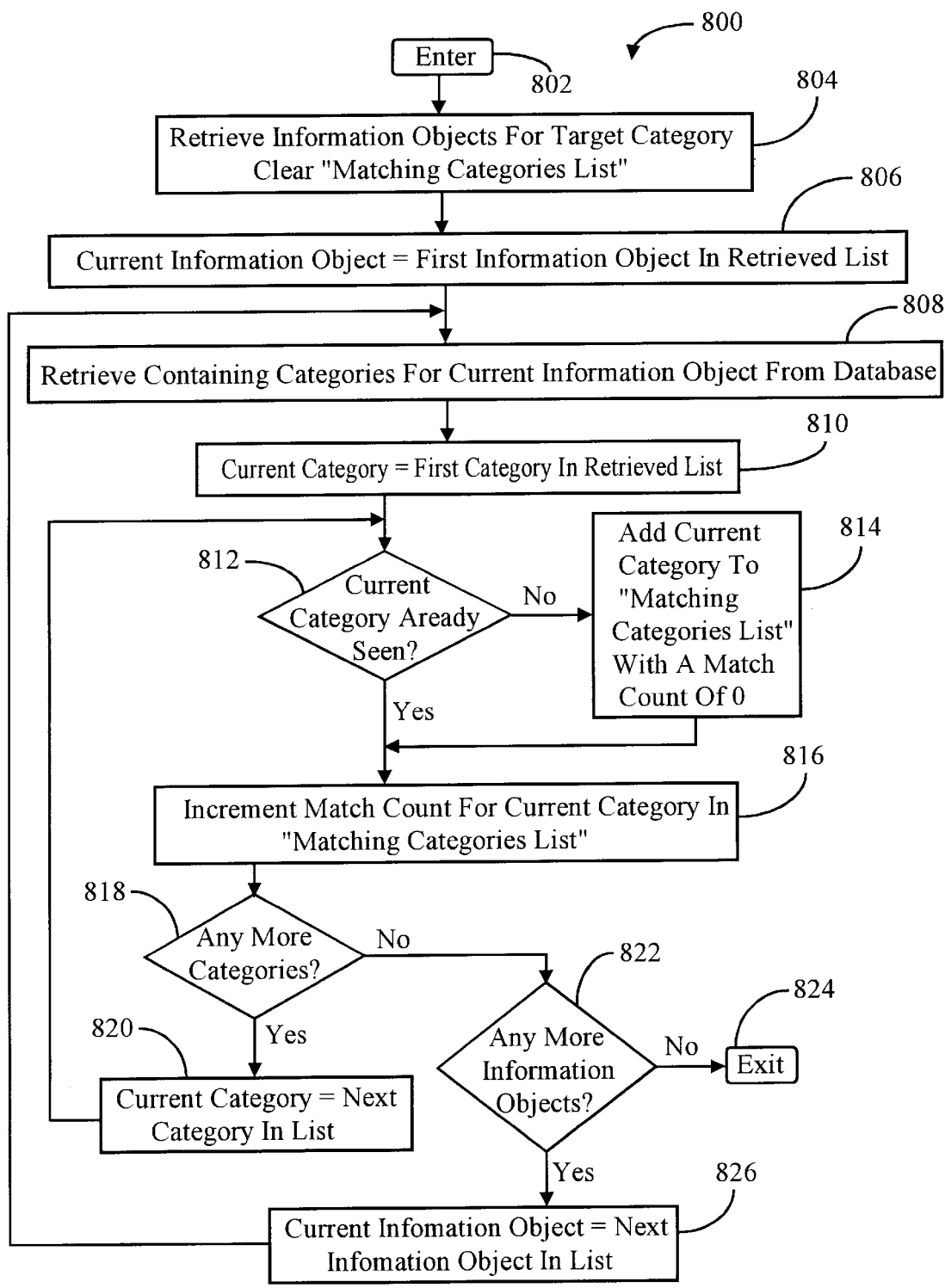
FIG. 8 is a flow chart to expand on the step of identifying a list of matching categories and associated matching counts for the current target category of FIG. 7.

The routine of step 710, as illustrated in flowchart 800 in FIG. 8, is entered at step 802 where it is assumed there is a single target user and a single target category. In step 804 the database category record (526) for the target category is retrieved with the a list of the "identifiers of constituent information objects" extracted from the target category record. This list is compiled from the sub-fields of field 528 of the target category record (see FIG. 5). Additionally, the "matching category list" is cleared to be used by the routine to define a new "matching categories list" as described below. In an alternative embodiment, the list of identifiers of constituent information objects can be restricted to just those objects belonging to specified domains. For instance, certain domains might provide more consistent matching performance.

Next, at step 806, the identifier of constituent information object corresponding to the first information object identifier in the information object identifier list created in step 804 is made the "current information object". In step 808, the information object record for the "current information object" is retrieved from the database (the data structure of that record corresponds to information object record 514 of FIG. 5). From the information object record of the "current information object" a list of identifiers of containing categories from field 516 of FIG. 5 is created. Then at step 810, the category corresponding to the identifier of the first category from the list created at step 808 is selected as the "current category".

Continuing at step 812, a test is performed to determine if the "current category" has already been encountered in this process. If the response to step 812 is "no", execution proceeds to step 814 where the "current category" is added to the "matching category list" (a list of categories that include an identifier to at least the "current information object") with a "match count" for the "current category" initialized to 0.

Then, from step 814, or if the result of step 812 is "yes", execution proceeds to step 816 where the "match count" for the "current category" is incremented by 1. The "match count" for a category denotes how many matching information objects there are between that category and the "target category".

An alternative to step 816 is to use the ratings for matching information objects, if supplied. In that case, the current information object will have a "target rating" as supplied by the target user, and it will also have an "other rating" as supplied by the originating user of the current category. The match count of the current category is then incremented by an amount proportional to the similarity between the target rating and the other rating. For instance, the absolute value of the difference between the target rating and the other rating integers could be calculated. Then the match count of the current category could be incremented by the result of subtracting that difference from 100.

Proceeding to step 818, a test is performed to determine whether there are any categories left on the list created in step 808 which have not been considered. If there are more categories on the list from step 808, the test result at step 818 is "yes", and execution proceeds to step 820. At step 820, the next category on the list from step 808 is set equal to the "current category", and execution returns to step 812. The loop of steps 812, 814, 816, 818 and 820 continues until the list of categories from step 808 is exhausted. Each new category is added to the "matching categories list" in step 814 exactly once, however, on each subsequent pass through step 816 the corresponding "match count" for such a category is merely incremented by one each time through.

Once the final category from the list of step 808 has been considered, the result of the test of step 818 will be "no" with execution then proceeding to step 822. At step 822, a test is performed to determine if there are any more information objects left on the list created at step 804 to consider. If the result of the test of step 822 is "yes", execution proceeds to step 826 where the next information object in the list of step 804 is set equal to the "current object", and execution returns to step 808, repeating the loop of steps 808, 810, 812, 814, 816, 818, 820 and 826 for another information object. When the final information object from the list of step 804 has been considered, the test result of step 822 will be "no", with execution proceeding to exit at step 824. At step 824, the flowchart 800 of FIG. 8 is complete, and assembly of the "matching categories list" together with a "match count" for each matching category has been accomplished.

Returning to flowchart 700 of FIG. 7, execution of step 710 is thus completed and the decision flow proceeds to step 712. In step 712, a decision loop is begun to examine all of the "matching categories" from the list created in step 814, together with the associated "match count". Optionally, a cache could be maintained at the host processing station comprising a list of the strongest matching categories for each category. When speed is of the essence, instead of following the routine of step 710 as described, this cache could be consulted to quickly provide a list of matching categories for a given category. However such a list would not necessarily contain the most recent information.

At step 712 the first category from the list of "Matching categories" is set equal to the "current matching category". Then at step 714, another decision loop is begun to calculate a score for each unmatched information object identified by each category identified in the list created in step 814 as it cycles through as the "current matching category". Note, an unmatched information object is an information object which is linked with at least one matching category in the list from step 814, but is not also linked with the target category. Also note that an unmatched information object may occur in more than one matching category. Thus, in a preferred embodiment, a score for an unmatched information object is calculated by summing the match counts for each matching category in which it occurs. Then, all of the unmatched information objects and their associated scores are added to a "recommendations list".

In an alternative embodiment, before the addition of "match counts" in step 714, the "match count" for each "matching category" can be divided by the number of information objects linked to by that "matching category," in order to normalize for categories which may have large differences in their cardinality.

Proceeding to step 718, a test is performed to determine whether there are any more "matching categories" in the list found of step 814 which have not yet been addressed. If the test result of step 718 is "yes", execution continues at step 716 where the "current matching category" is set equal to the next unaddressed "matching category" in the list from step 814, and execution continues at step 714. The loop of steps 714, 716 and 718 continues until the list of matching categories is exhausted, at which point the test result at step 718 will be "no" and execution continues with step 720.

At step 720, the "recommendations list" of information objects is sorted by the score assigned to each in step 714. Then, at step 722, information objects from the "recommendations list" are provided to the "target user" in the context of the "current target category". These recommendations, at least initially, will consist of the top scoring information objects from the "recommendations list". In addition, for each recommended information object, the corresponding score, and a list of all of the originating categories and users who submitted them are also provided to the "target user". In the preferred embodiment of the present invention, the location pointers or identifiers of these object recommendations will be downloaded to the target user's client terminal 104x (FIG. 1). Software running on the target user's client terminal could also allow the user to select whether to receive recommendations of information objects, originating users, originating categories or any combination thereof. Furthermore, the target user could exercise an option as to whether to receive a specified number of recommendations for a "target category", or alternatively just those recommendations whose score exceeds a specified threshold score. Finally, the target user could elect to receive recommendations from particular specified domains, e.g., only documents, or only books.

At step 726, a test is performed to determine whether there are any additional "target categories" in the list created in step 704. If the test result of step 726 is "yes" execution proceeds to step 728 where the next target category in the list is set equal to the "current target category," and execution proceeds to step 708 to repeat steps 708 through 726 for the new target category. If the test result of step 726 is "no" then the routine exits at 724, having completed all loops and having made recommendations for each specified "target category".

Thus, the discussion of FIGS. 5–8 illustrates how the present invention provides a method for determining recommendations based on a user's categories of collected information objects, where the determined recommendations are likely to be ones that are relevant to the user's categories.

Further, it should be noted that whether the category and object information created by each user is stored in the user's own client terminal 104x, or in host 102, is clearly a matter of design choice and not a requirement of the present invention. All that the present invention requires is that host 102 have access to that information from each user that is participating in the use of the present invention.

While the above discussions of the present invention address a variety of implementations and applications, the implementations and applications addressed are clearly not an exhaustive list. One could easily extend such lists to many other implementations and applications and the techniques discussed above could easily be extended to each of them. Thus, the present invention is not limited solely to the scope of what has been discussed above, but rather is only limited by the scope of the claims appended hereto.

Further, in the foregoing specification, the invention has been described with reference to a specific exemplary embodiment. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention as disclosed by the flowcharts may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A method for identifying recommended objects to a target user, under control of said target user for inclusion in a category created by the target user based on said target user's categorization of objects and the categorizations of objects by other users, the method executing on a computer system including a processor, a categorizations database, an input device and an output device, wherein the categorization database includes a plurality of category records, with each category record associated with a category selected by a single user, where a category record includes a pointer to at least one object record for an object chosen by the user as belonging in the corresponding category, and where a user can be associated with a plurality of categories with the originating user being identified in each category record, the method comprising the following steps:

accepting signals from the input device operated by said target user to generate a plurality of target category records, where each target category record indicates object records corresponding to objects chosen by said target user as belonging together;

searching, in response to a request from said target user, for at least a subset of said category records entered by any user into the categorizations database to locate matching category records containing a pointer to at least one object record corresponding to an object also found in said target categories;

assigning each of the matching category records a match count with respect to each target category record, where a match count assigned to one category record with respect to another category record is equal to the number of common records pointed to in both of said category records;

identifying unmatched object records in matching category records with respect to each target category record, where an unmatched object record is an object record pointed to in a matching category record which is not pointed to in said target category record;

associating each unmatched object record with a list of all originating category records, where an originating category record for an object record is a matching category record which points to it;

associating each unmatched object record with a list of all originating users, where each originating user is associated with an originating category record for said unmatched object record;

assigning a weight to an unmatched object record, where said weight is a function of at least said match counts of the originating category records;

ranking unmatched records by weight for each target category record;

selecting recommended object records for each target category record from said unmatched records according to the results of the step of ranking; and outputting recommendations to said target user for each target category, where recommendations for a target category indicate recommended objects corresponds to said target category record, pointers to the originating category records of the said recommended object records, and pointers to the originating users of the said recommended objects.

2. The method of claim 1 wherein the input device is a personal computer used by the target user.

3. The method of claim 1 wherein the step of accepting signals from the input device comprises the steps of:

determining existing category records and corresponding object records of said target user; and selecting a plurality of identified in the determining step as the target category records.

4. The method of claim 1 wherein said category records can have a title that is the same as the only object record pointed by the corresponding category record.

5. The method of claim 3 wherein said object records pointed to by said target category records include pointers to information objects accessible via a data communications network, and the user's existing category records are collections of such pointers which have been organized hierarchically.

6. The method of claim 3 wherein the step of selecting target category records comprises the step of selecting all category records which have been created by the target user, or whose composition has been changed by the target user, since the previous occasion upon which the system was invoked.

7. The method of claim 1 further including a scalar preference value optionally associated with each object, which preference value is provided by the user associated with said object and said scalar preference value is included in a field of the corresponding object record.

8. The method of claim 7 wherein the step of assigning a weight to an unmatched object record comprises the steps of:

calculating a weighted average of (a) said match count, and (b) the similarity between said preference value assigned by the originating user associated with said originating category record and said preference value assigned by the target user, the relative weights being determined by a balancing value for each originating category record associated with said unmatched object record; and calculating said weight for said unmatched object record as a sum of said weighted averages for each associated originating category record.

9. The method of claim 1 further comprising the steps of:

generating a ranking of originating users by weight, the weight of an originating user being the average of the weights of the recommended object records associated with said user;

delivering as recommendations to said target user pointers to originating categories and associated originating users, ordered by said ranking; and controlling a predetermined communication means in order to initiate communication between said target user and at least a subset of said originating users.

10. The method of claim 1 wherein said object records are identifiers of people.

11. The method of claim 1 wherein said target category record is a nominal category record created to point to a single object record that corresponds to an object supplied by the corresponding user as an input to the system.

12. The method of claim 1 further comprising the steps of:

said target user selecting one of said recommendations; and repeating the entire method of claim 1 using a category record containing a pointer to just the selected recommendation object record as the sole target category record.

13. The method of claim 1 wherein the categorization database includes a table of category records, wherein each category record corresponds to a category, and objects:

each of said category records includes:

a single owner field identifying the user who created said category that corresponds to said category record; and a set of object fields, wherein each object field corresponds to an object placed in said category by the corresponding user; and each of said object records includes a set of category fields, where each include category field corresponds to a category in which said object was included by the corresponding user.

14. The method of claim 13 wherein the step of searching the categorization database comprises:

identifying a set of constituent object records pointed to by said target category record; and identifying a set of containing records said set being the union of the sets of containing category records associated with each constituent object record from said list of constituent object records.

15. An apparatus for identifying recommended objects to a target user, under control of said target user, said apparatus comprising:

a processor;

a categorizations database containing information on a plurality of user categories, each category created by a single user to indicate a plurality of objects identified by said creating user wherein each user can be associated with a plurality of categories;

an input/output device coupled to said processor to accept input commands from said target user of information on a plurality of target categories, a target category being an indication of a plurality of objects chosen as belonging together by said target user;

memory coupled to said processor to contain said database, target categories and weighting values;

communications software to communicate data between said processor, said categorizations database, said input/output device and said memory;

software to control said processor to perform a search initiated by said target user of said categories entered by any user stored in said categorizations database for categories with at least one object in common with one of said target categories, and to generate for each target category a list of unmatched objects found in the located records, wherein an unmatched object is an object not found in said target category; and ranking software, coupled to said processor to rank said unmatched objects with respect to each target category in a ranking, based on a function of at least the number of objects in common between said target category and said category associated with said unmatched object;

wherein said input/output device also outputs an indication of said unmatched objects to said target user for each target category, ordered according to said ranking.

16. A computer-implemented method for identifying recommended objects to a target user, under control of said target user for inclusion in a category created by the target user based on said target user's categorization of objects and the categorizations of objects by other users, wherein the categorization database includes a plurality of category records, with each category record associated with a category selected by a single user, where a category record includes a pointer to at least one object record for an object chosen by the user as belonging in the corresponding category, and where a user can be associated with a plurality of categories with the originating user being identified in each category record the method comprising the following steps:

accepting instructions form the target user for generating a plurality of target category records, wherein each target category record indicates object records corresponding to objects chosen by said target user as belonging together;

searching, in response to a request from said target user, for at least a subset of said category records entered by any user into the categorizations database to locate matching category records containing a pointer to at least one object record corresponding to an object also found in said target categories;

assigning each of the matching category records a match count with respect to each target category record, wherein a match count assigned to one category record with respect to another category record is equal to the number of common records pointed to in both of said category records;

identifying unmatched records in matching category records with respect to each target category record, wherein an unmatched object record is an object record pointed to in a matching category record which is not pointed to in said target category record;

associating each unmatched object record with a list of all originating category records, wherein an originating category record for an object record is a matching category record which point to it;

associating each unmatched object record with a list of all originating users, wherein each originating user is associated with an originating category record for said unmatched object record;

assigning a weight to an unmatched object record, wherein said weight is a function of at least said match counts of the originating category records;

ranking unmatched object records by weight for each target category record;

selecting recommended object records for each target category record from said unmatched object records according to the results of the step of ranking; and outputting recommendations to said target user for each target category, wherein recommendations for a target category indicate recommended objects corresponding to said target object records for said target category that corresponds to said target category record, pointers to the originating category records of the said recommended object records, and pointers to the originating users of the said recommended objects.

17. The computer-implemented method of claim 16 wherein the step of accepting signals from the input device comprises the steps of:

determining existing category records and corresponding object records of said target user; and selecting a plurality of records identified in the determining step as the target category records.

18. The computer-implemented method of claim 16 wherein said category records can have a title that is the same as the only object record pointed to by the corresponding category record.

19. The computer-implemented method of claim 18 wherein said object records pointed to by said target category records include pointers to information objects accessible via a data communications network, and the user's existing category records are collections of such pointers which have been organized hierarchically.

20. The computer-implemented method of claim 18 wherein the step of selecting target category records comprises the step of selecting all category records which have been created by the target user, or whose composition has been changed by the target user, since the previous occasion upon which the system was invoked.

21. The computer-implemented method of claim 16 further including a scalar preference value optionally associated with each object, which preference value is provided by the user associated with said object and said scalar value is included in a field of the corresponding object record.

22. The computer-implemented method of claim 21 wherein the step of assigning a weight to an unmatched object record comprises the steps of:

calculating a weighted average of (a) said match count, and (b) the similarity between said preference value assigned by the originating user associated with said originating category record and said preference value assigned by the target user, the relative weights being determined by a balancing value for each originating category record associated with said unmatched object record; and calculating said weight for said unmatched object record as a sum of said weighted averages for each associated originating category record.

23. The computer-implemented method of claim 16 further comprising the steps of:

generating a ranking of originating users by weight, the weight of an originating user being the average of the weights of the recommended object records associated with said user;

delivering as recommendations to said target user pointers to originating categories and associated originating users, ordered by said ranking; and controlling a predetermined communication means in order to initiate communication between said target user and at least a subset of said originating users.

24. The computer-implemented method of claim 16 wherein said objects are identifiers of people.

25. The computer-implemented method of claim 16 wherein said target category record is a nominal category created to point to a single object record that corresponds to an object supplied by the corresponding user as an input to the apparatus.

26. The computer-implemented method of claim 16 further comprising the steps of:

said target user selecting one of said recommendations; and repeating all of the steps of claim 16 using a category record containing a pointer to just the selected recommendation object record as the sole target category record.

27. The computer-implemented method of claim 16 wherein the categorization database includes a table of category records, wherein each category record corresponds to a category, and objects:

each of said category records includes:

a single owner field identifying the user who created said category that corresponds to said category record; and a set of object fields, wherein each object field corresponds to an object placed in said category by the corresponding user; and each of said object records includes a set of category fields, where each included category field corresponds to a category in which said object was included by the corresponding user.

28. The computer-implemented method of claim 27 wherein the step of searching the categorization database comprises:

identifying a set of constituent object records pointed to by said target category record; and identifying a set of containing category records, said set being the union of the sets of containing category records associated with each constituent object record from said list of constituent object records.

* * * * *